United States Patent [19]

Fawal et al.

[11] Patent Number: 5,663,634

[45] Date of Patent: Sep. 2, 1997

[54] STARTUP NETWORK FOR A FLYBACK CONVERTER WITH LINEAR REGULATION

[75] Inventors: Marwan Ahmad Fawal, Santa Clara; Cameron Lyle Spitzer, San Jose; Ryan Edgar Hirth, Cupertino, all of Calif.

[73] Assignee: 3COM Corporation, Santa Clara, Calif.

[21] Appl. No.: 641,400

[22] Filed: Apr. 30, 1996

[51] Int. Cl.[6] ................................................ G05F 1/40
[52] U.S. Cl. ................................. 323/273; 363/16; 363/95
[58] Field of Search ............................. 323/226, 273, 323/304; 363/16, 95

[56] References Cited

U.S. PATENT DOCUMENTS

| 4,496,817 | 1/1985 | Smith | 219/10.55 M |
| 4,710,699 | 12/1987 | Miyamoto | 323/324 |

Primary Examiner—Stuart N. Hecker
Attorney, Agent, or Firm—Townsend and Townsend and Crew, LLP

[57] ABSTRACT

A flyback converter using a commercially available voltage regulator with protection mode includes a bypass resistor between the input and output of the voltage regulator to drain charge from the input stage during powerup thereby preventing the regulator from locking in protection mode.

7 Claims, 3 Drawing Sheets

STARTUP NETWORK FOR A FLYBACK CONVERTER WITH LINEAR REGULATION

BACKGROUND OF THE INVENTION

The present invention relates to the field of electronic circuits. More particularly, the present invention relates to a circuit for providing a regulated voltage source while avoiding having a voltage regulator lock in protection mode. The present invention has particular applications in the area of constructing a voltage source and voltage isolation circuit for use in a coaxial tranceiver network for a computer network.

SUMMARY OF THE INVENTION

The present invention is an electronic circuit that produces a regulated voltage supply at a voltage different from a source voltage and that also provides high voltage isolation between a source voltage and the output of the regulated voltage supply. The invention includes a bypass resistor placed from the input to the output of a commercially available linear voltage regulator (VR). This resistor prevents the regulator from locking into a protection mode even when the regulator is driven by an unbounded smoothing capacitor.

The bypass resistance value is selected so that its effect during steady-state operation is negligible. The circuit of the present invention is in one embodiment constructed with a switching transistor, a transformer, a rectifier, smoothing capacitors, and a linear VR. The bypass resistor from the input to the output of the linear VR prevents the VR from locking in protection mode.

As an example, the circuit of the present invention may have a variable input supply voltage of +12V, may provide an output supply voltage of −9V, and may provide voltage isolation between a power supply ground and a shield ground of 2,000V.

In one specific embodiment, the circuit of the present invention is incorporated into an adapter circuit that is designed to meet the well-known I.E.E.E. 802.3 specification for Ethernet network communication via coaxial cable.

DESCRIPTION OF THE PREFERRED EMBODIMENT

Figure 1:
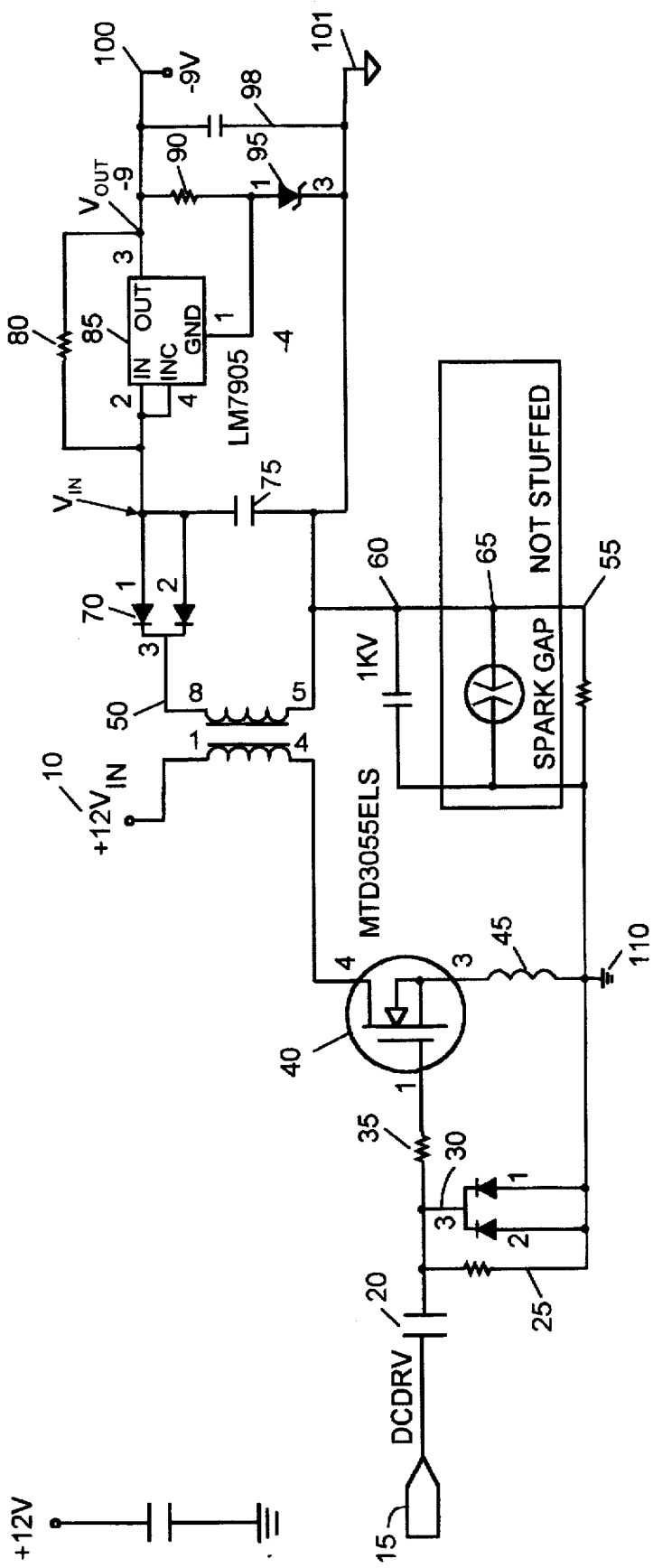
FIG. 1 is a block schematic of a flyback voltage converter with a bypass resistor according to an embodiment of the invention.

FIG. 1 is a circuit schematic of a flyback voltage converter with a bypass resistor according to the present invention. The purpose of this circuit is to produce, from a +12V power supply 10 and from DCDRV square wave 15, a −9V output voltage at output 100 while providing a high voltage isolation so that the circuit will operate properly even when shield ground 101 is up to 2,000V higher than the board ground 110. The circuit shown might be included on a network adaptor card as part of the tranceiver connector for a coaxial cable carrying a network signal.

The left most portion of the circuit shown includes an FET 40 and an FET driver stage. This stage is driven by DCDRV signal 15, which, according to one example, is a 0 to +5V square wave at 312 Khz supplied by an ASIC. The FET driving circuitry is provided with AC coupling capacitor 20 to prevent damage if the DCDRV signal sticks at a high voltage. Resistor 25 and 35 provide a means to control the voltage to FET 40's gate input and diode 30 prevents the capacitance of the gate of FET 40 from going negative. Ferrite bead 45 is an inductor to prevent high energy voltage spikes being transferred in the form of EMI.

Spark gap 65, capacitor 60 and resistor 55 are required by the ethernet specification to provide isolation between shield ground 101 and board ground 110. The spark gap allows power to dissipate when the two grounds exceed a certain voltage difference as specified in 802.3 in order to prevent the voltage difference causing damage elsewhere in the circuit. Capacitor 60 and resistor 55 provide a high impedance isolation between grounds 110 and 101 to stabilize the two grounds.

FET 40 is a power field effect transistor that drives transformer 50 in response to switching signal DCDRV. When FET 40 is on, current can flow from supply 10 and a magnetic field develops in transformer 50. When FET 40 is turned off, the magnetic field in 50 breaks down, and current is forced to flow through diode 70 from rectifying capacitor 75. This causes a negative voltage to build on capacitor 75. Transformer 50 provides one stage of voltage isolation between board ground 110 and shield ground 101.

Capacitor 75 and diode 70 operate in the usual way to produce a negative voltage across capacitor 75. When FET 40 is on, magnetic energy builds in the secondary side of transformer 50 and no current can flow in the direction counter to diode 70. When FET 40 is off, this magnetic energy drains from the secondary side of transformer 50 in the direction set by diode 70 and causes a negative voltage to build on capacitor 75. Because this charge is supplied by a magnetic field, there is no control on the voltage that can develop on capacitor 75, which, if no charge is drained from 75, can go as negative as leakage tolerances of capacitor 75 and other circuit elements will allow.

VR 85 is, according to one embodiment, a commercially available voltage regulator that provides a constant −5V difference between its pin 1 (GND) and pin 3 (OUT) so long as there is a more than −5V difference between pin 1 and pin 2 (IN). VR 85's input is driven by the negative voltage on capacitor 75. When VR 85 is operating as intended in a steady state mode, VR 85 holds its pin 3 at −5V with respect to pin 1. Zener diode 95 creates the −4V reference which acts as the GND for VR 85 and resistor 90 is a current regulating resistor for diode 95. Thus, the circuit acts to hold the voltage across capacitor 98, an output filtering capacitor to stabilize the output voltage, at −9 volts, and the circuit operates as intended.

However, in a typical application in which the circuit shown in FIG. 1 will be employed, VR 85 is a commercially available VR that includes a protection mode. This protection mode causes VR 85 to shut off if the voltage difference between its input terminals and its output terminals becomes too high. Should this happen in a prior art circuit without resistor 80, there is no path to drain the negative voltage on capacitor 75 and therefore there nothing to limit the buildup of negative charge on capacitor 75. In the circuit shown, without resistor 80, as capacitor 75 becomes more negative, VR 85 is driven further into its protection mode, thereby causing VR 85 to lockup in its protection mode and causing the circuit to not function.

Figure 2:
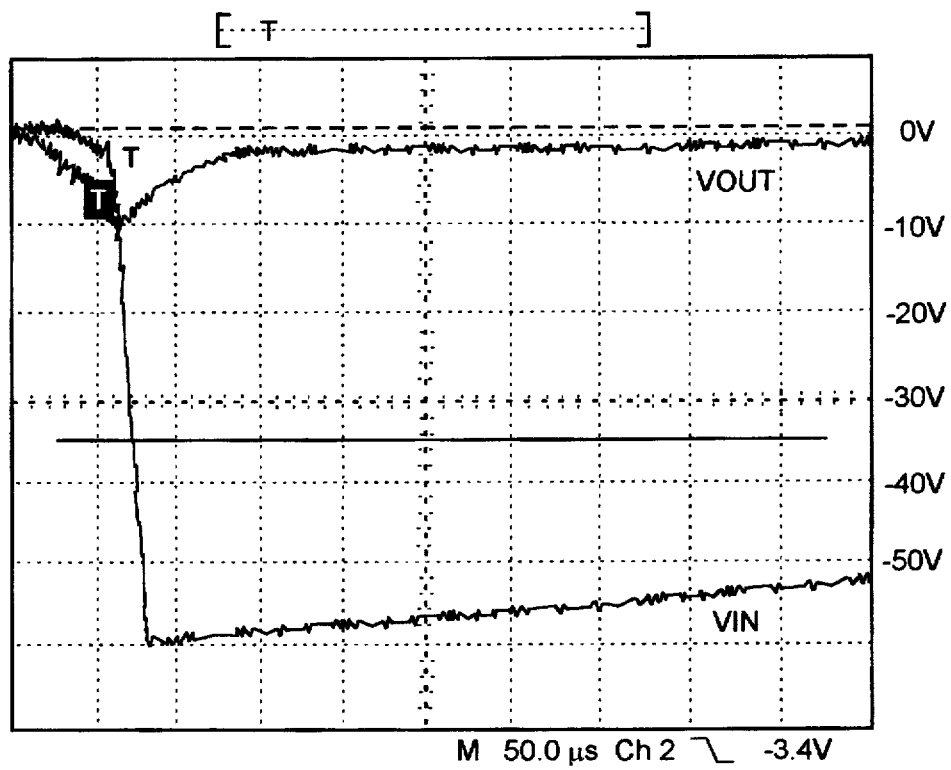
FIG. 2 is a diagram of the relationship between the input and output voltage of a voltage regulator lacking the bypass resistor of the current invention and therefore experiencing protection mode lockup.

FIG. 2 is an illustration of this lockup which can happen during power up in the FIG. 1 circuit lacking resistor 80. FIG. 2 illustrates the voltage in to VR 85 (VIN) compared to the voltage out of VR 85 (VOUT). As can be seen in the figure, VOUT drops along with VIN down to around −10 volts just after power is applied, but then rises back up to near 0 volts as VR 85's protection mode kicks in and VR shuts off. At the same time, VIN continues to lower than −50 volts, a limit determined by other leakages in the circuit. VIN remains at this voltage, VR remains in protection mode, and the circuit does not function as intended.

The present invention avoids this problem by use of resistor 80 which is carefully selected in value to prevent VR from locking in protection mode. Resistor 80 bleeds off just enough current during power-up to prevent VR 85 from locking in protection mode. In one particular example, resistor 80 is a 274 Ohm resistance, but the value could be 50 to 500 Ohms.

Resistor 80 is not designed to provide an alternative current supply across VR 85 during steady state operation, as in done in the prior art. In the current invention, resistor 85's value is selected so that at steady state, the resistor's effects on the circuit is negligible given the impedance of the VR.

According to the invention, resistor 80 is selected so that its value is high enough so that in steady-state operation it is negligible when compared to the impedance of the VR, but yet provides enough current in the failing case to dissipate charge across VR 85 when VR 85 is in protection mode.

Figure 3:
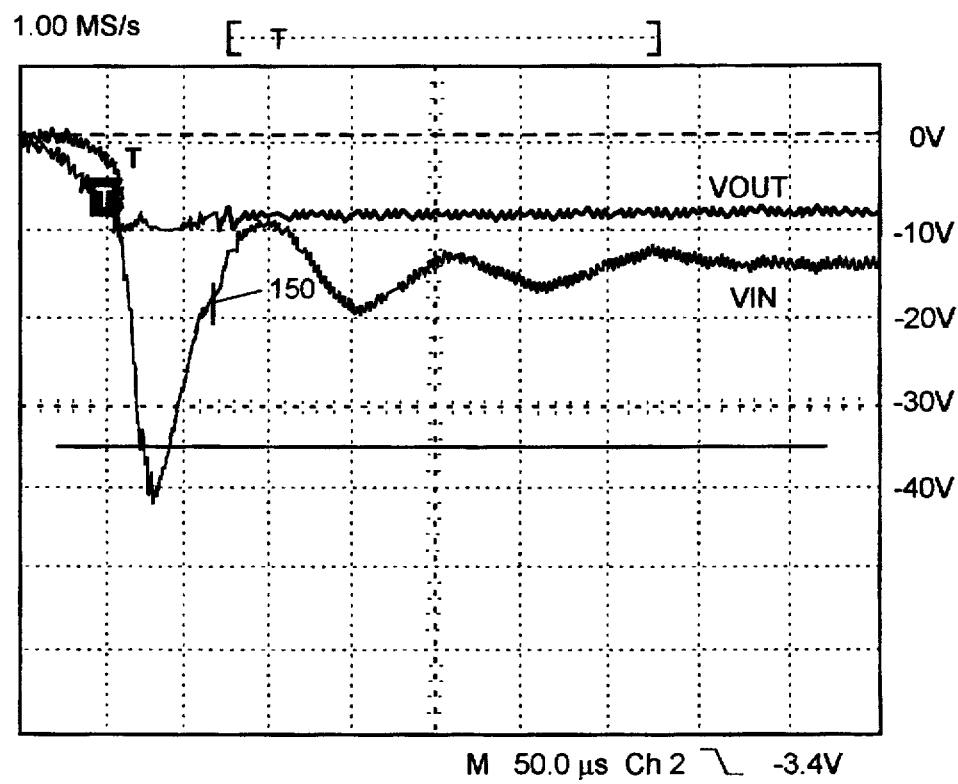
FIG. 3 is a diagram of the relationship between the input and output voltage of a voltage regulator including the bypass resistor of the current invention where protection mode lockup is prevented.

FIG. 3 illustrates the voltage in to VR 85 (VIM) compared to the voltage out of VR 85 (VOUT) when bypass resistor 80 is used properly according to the present invention. As can be seen in the figure, VOUT drops along with VIN down to around −10 volts and then rises slowly as VR 85's protection mode kicks in and VR 85 begins to shut off, and VIN therefore begins to fall. However, at that point, because of the large voltage difference between VIN and VOUT, resistor 80 is bleeding current between VIN and VOUT and draining negative voltage from capacitor 75. When the voltage across 75 rises high enough, the protection mode on VR 85 stops and VR 85 begins conducting current. This in indicated by the point labeled 150 in the figure. At that point, the VOUT signal becomes nearly stable and the VIN signal also stabilizes.

Figure 4:
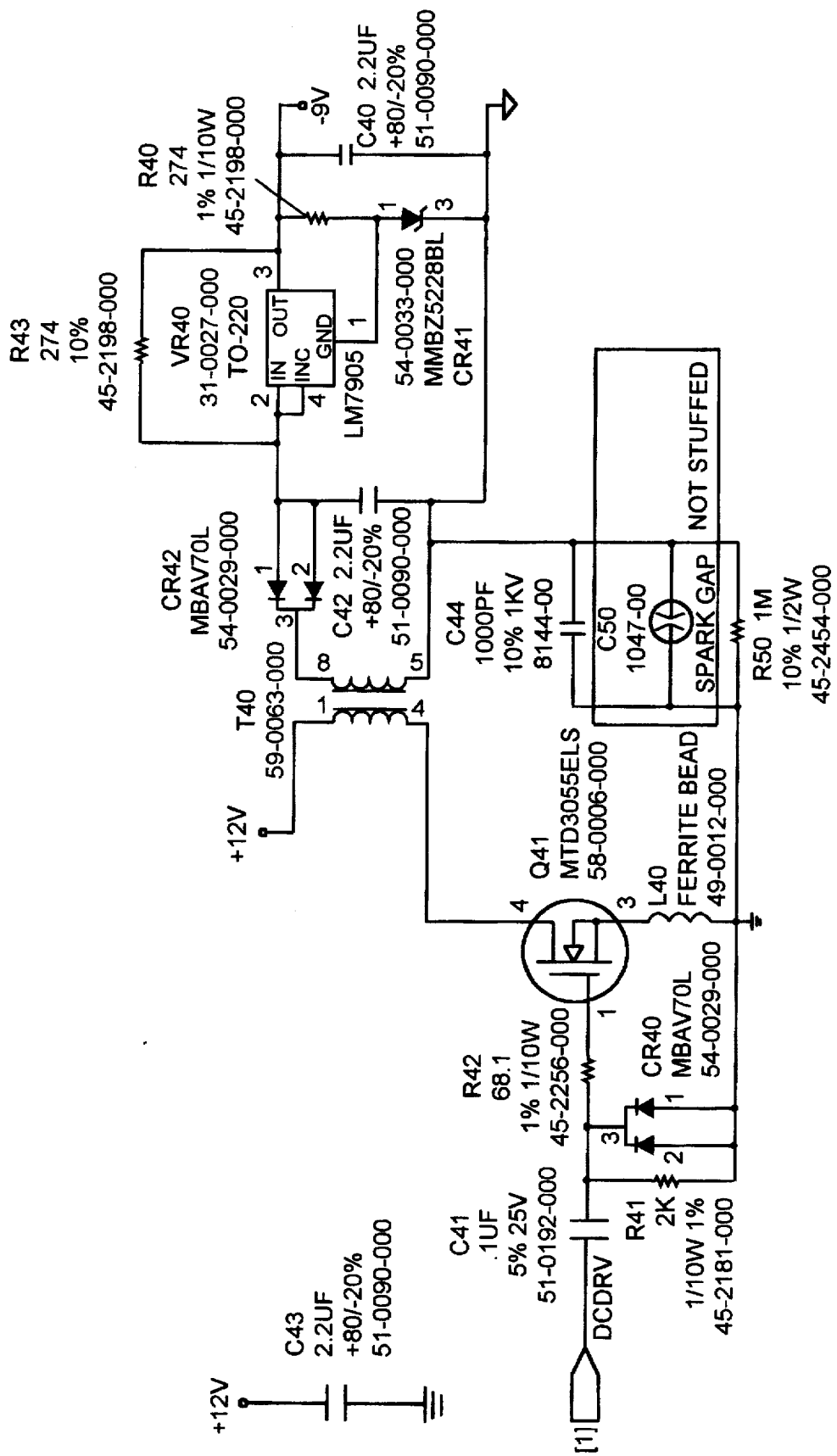
FIG. 4 is a schematic of a flyback voltage converter with a bypass resistor including specific values for all circuit components according to one specific example of the invention.

FIG. 4 is a schematic of a flyback voltage converter with a bypass resistor according to a detailed example of an embodiment of the invention, including specific values for a number of circuit components.

The typical prior art design approach to solving this problem would be to increase the capacitance of 75, slowing down the time constant of the startup circuitry, as this would decrease the rise time of VIN and would prevent the VIN voltage from ever reaching a level that would cause protection mode locking. A major disadvantage to this solution is the increased cost of using a large discrete component capacitor for 75. In a specific example, capacitor 75 is a 2.2 microfarad multilayered ceramic capacitor. This represents one of the larger surface mount capacitances available that are suitable for this long-life application. Bypass resistor 80 provides a lower cost solution for preventing protection lockup than using a larger capacitor in this application.

Other typical prior solutions using resistors convert power less efficiently than the present invention.

What is claimed is:

1. A circuit for providing a constant regulated voltage supply from a variable voltage source comprising:
   a voltage regulator having an input pin, and output pin, and a ground pin; and
   a bypass resistor connecting said input pin to said output pin, said bypass resistor having a value selected to be negligible compared to the impedance of said voltage regulator during steady-state operation.

2. The circuit according to claim 1 further comprising a smoothing capacitor connected to the input of said voltage regulator.

3. The circuit according to claim 2 further comprising a switched transformer diode-connected to said smoothing capacitor for placing charge on said capacitor.

4. The circuit according to claim 3 further comprising an FET switching stage including an FET power transistor gated by a periodic signal periodically driving the primary side of said transformer under control of said periodic signal.

5. A method for preventing a voltage regulator having a protection mode for experience protection mode lockup comprising placing a resistance value between and input pin and an output pin of said regulator, said resistor value selected to be negligible compared to the impedance of said voltage regulator during steady-state operation.

6. The method according to claim 5 wherein said voltage regulator has an input driven by an unbounded smoothing capacitance.

7. A flyback converter for providing a constant regulated voltage supply from a variable voltage source comprising:
   a voltage regulator having an input pin, and output pin, and a ground pin;
   a bypass resistor connecting said input pin to said output pin, said bypass resistor having a value selected to be negligible compared to the impedance of said voltage regulator during steady-state operation;
   a smoothing capacitor connected to the input of said voltage regulator;
   a switched transformer diode-connected to said smoothing capacitor for placing charge on said capacitor.
   an FET switching stage including an FET power transistor gated by a periodic signal periodically driving the primary side of said transformer under control of said periodic signal; and
   a supplied periodic signal for driving a gate of said FET.

* * * * *